(12) United States Patent
Schulze

(10) Patent No.: US 6,550,495 B1
(45) Date of Patent: Apr. 22, 2003

(54) SAFETY DEVICE FOR CUTTING OFF GAS PIPELINES

(75) Inventor: Klaus Schulze, Gernrode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 0 days.

(21) Appl. No.: 09/743,670

(22) PCT Filed: Jul. 8, 1999

(86) PCT No.: PCT/EP99/04808

§ 371 (c)(1),
(2), (4) Date: Jan. 10, 2001

(87) PCT Pub. No.: WO00/04310

PCT Pub. Date: Jan. 27, 2000

(30) Foreign Application Priority Data

Jul. 13, 1998 (DE) .......................................... 198 31 283

(51) Int. Cl.[7] .............................................. F16K 17/38
(52) U.S. Cl. ..................... 137/614.2; 137/79; 137/81.1; 137/457; 137/468; 251/111
(58) Field of Search .......................... 137/81.1, 79, 80, 137/456, 457, 461, 468, 458, 614.2; 251/111

(56) References Cited

U.S. PATENT DOCUMENTS

| | | |
|---|---|---|
| 3,491,796 A | 1/1970 | Scaramucci |
| 3,780,759 A | 12/1973 | Yahle |
| 5,215,121 A * | 6/1993 | Michl ...................... 137/614.2 |
| 5,551,479 A | 9/1996 | Graves |
| 5,913,326 A | 6/1999 | Lembser |

FOREIGN PATENT DOCUMENTS

| | | |
|---|---|---|
| DE | G 94 20 607.4 | 3/1995 |
| DE | 296 12 921 U1 | 10/1997 |
| EP | 0 118 152 | 9/1984 |
| EP | 0 432 371 A1 | 8/1990 |
| EP | 0 343 615 B1 | 7/1993 |
| EP | 0 637 457 A1 | 2/1995 |
| WO | WO 93/01435 | 1/1993 |
| WO | WO 96/03180 | 2/1996 |

* cited by examiner

*Primary Examiner*—Kevin Lee
(74) *Attorney, Agent, or Firm*—Harness, Dickey & Pierce, P.L.C.

(57) ABSTRACT

A thermal safety device for cutting off gas pipelines, wherein gas transfer is prevented by the safety device when temperature increases in the section of the gas pipeline placed downstream from the safety device, especially when connected gas apparatuses are in a closed position maintains production costs and dimensions at a level as low as possible. The safety device includes a check valve which prevents backflow from the gas pipeline which is placed downstream from the device. The inventive device also includes a pressure sensitive element placed downstream from the safety device which is actuated by the pressure in the pipeline. The pressure sensitive element is coupled to a cut-off valve in such a way that when pressure increases in the downstream pipeline the valve prevents gas from flowing into the pipeline.

20 Claims, 12 Drawing Sheets

SAFETY DEVICE FOR CUTTING OFF GAS PIPELINES

BACKGROUND AND SUMMARY OF THE INVENTION

The invention relates to a safety device for cutting off gas pipelines when temperature increases in an unacceptable way according to the preamble of the first patent claim.

Such thermal valve safety devices that are employed in pipelines, such as upstream from gas apparatuses, gas meters, etc., are available in a large variety of designs. They are used to interrupt gas supply before temperature increases at the aforementioned gas apparatuses to such level that their external tightness is jeopardised.

EP 118 152 A1 describes a valve in which a ball is kept respectively in open and, after reaching a limit temperature in closed position both by a spring and also by an alloy with thermal shape memory, with the spring being in such shape that automatic opening is impossible after closing.

The disadvantage of this solution is that the component of an alloy with thermal shape memory, located in the housing interior, has to be subjected to the higher temperature in order to achieve the desired closing of the valve. This means that the entire valve has to be heated in order to attain a response of the thermo-sensitive part by conduction of said heat. And it is necessary to place such valve immediately adjacent to each component that is jeopardised by temperature increase in order to detect the temperature in the area and, if need be, cut off the gas pipeline.

EP 343 615 A1 describes a valve with a cone as cut-off element. In this solution a guide rod is led through a valve cover and connects said plug with a fuse body that is pre-tensioned against the cover by means of a pressure spring. Softening of the fuse body removes the guide rod from the former so that, under the impact of the pressure spring, the plug can move abruptly in the closing direction.

Also this solution has the disadvantage that, on the one hand, the thermo-sensitive element is positioned in the housing interior and, hence, also the entire valve has to be heated and, on the other, such a valve has to be placed directly adjacent to each component that is jeopardised by temperature increase.

A thermal safety valve is also known from the utility model DE 94 20 607. This thermal safety valve is essentially of the same construction as the solution described above, i.e. the housing is provided with a soft solder which keeps a cut-off element, in this case a valve cone, in open position. Additionally a heating jacket, which is preferably electrically heatable, is provided at the valve housing in the area of the internal soft solder, so that the safety valve does not only actuate automatically after the soft solder is directly subjected to the higher temperature but which also facilitates its remote actuation.

The disadvantage of this solution is, that besides its complicated construction, it is necessary to provide additionally a source of auxiliary energy, piping and respective actuation elements.

EP 637 457 A1 describes an automatic closing device for a shut-off device. The element inhibiting the closing force has at least one pressure-actuated hollow body with a variable volume with a rated breaking point of a material whose melting temperature is adjusted to a defined limit value temperature. Upon achieving or exceeding said limit value temperature the closing operation is triggered by melting of the breaking point material and a subsequent pressure relief. The force of pressure in the hollow body is reduced and the closing force is activated. The rated breaking point can be executed as a reaction line that can be laid at any distance from the shut-off device so that a fire occurring in the reaction line yet at a distance from the shut-off device triggers the closing action.

The disadvantage of the latter solution is that the reaction line has to cover the entire area of the unit to be protected which, particularly in case of large units, entails disproportionately high costs.

DE 296 12 921 U1 describes a cut-off device for a gas pipeline system with a cut-off element that is kept in open position by at least one closing force-inhibiting element. The element has at least one pressure-actuated hollow body with a variable volume that is connected to a so-called function line consisting of a material whose melting temperature is adjusted to a defined limit value temperature. Melting of the function line causes a pressure drop in the hollow body and the closing force actuates the cut-off element so that the cut-off device is closed and the flow through the pipeline is discontinued. The pipeline outlet is additionally provided with a backflow check valve which, upon a pressure drop in the pipeline, prevents a gas backflow from the downstream pipeline.

In this cut-off device there is a pressure in the hollow body and the function line which is required to keep the cut-off element in the open position. Said pressure, however, is independent of the pressure in the gas pipeline.

It is also known that so-called gas flow control valves are used to automatically cut off gas pipelines. Said gas flow control valves are used to interrupt gas supply upon increase of gas consumption beyond a defined value.

The disadvantage of such gas flow control valves is that, in case of a damage at the gas pipeline, e.g. by a fire, and with a closed gas apparatus the gas volume flowing from the leak will have to be larger than the gas volume flow otherwise required for the operation of the gas apparatus before the gas flow control valve is closed.

The invention is focusing on the issue of developing a safety device for cutting off gas pipelines of the described type wherein the gas transfer through the safety device is prevented when temperature increases in the section of said safety device placed downstream from the gas pipeline, especially when connected gas apparatuses are in a closed position. In addition, it shall be possible to avoid an excessive pressure rise in the downstream pipeline. The aim of the invention is to maintain production costs and dimensions at a level as low as possible. According to the present invention the problem is solved by providing a safety device with a check valve that prevents a backflow from the gas pipeline which is placed downstream from said device and by arranging a pressure sensitive element which is actuated by the pressure in the pipeline downstream from said safety device. Said pressure sensitive element is coupled to a cut-off valve in such a way that when pressure increases in the downstream pipeline said valve prevents gas from flowing into the pipeline.

Thus a solution has been found that removes the disadvantages of the prior art that a thermal element in the housing interior has to be actuated by the higher temperature in order to achieve the desired closing of the valve. It is also no longer necessary to place such valve directly adjacent to each component that is jeopardised by a temperature increase in order to detect the temperature in this area and, if need be, cut off the gas pipeline. Further distinguishing features of this solution are above all its simplicity and production dimensions.

Further advantageous arrangements of the invention are described in the other patent claims. In order to prevent, for instance, the pressure rise from becoming excessively high after a temperature increase in the downstream pipeline a backflow can be released from the downstream pipeline by the check valve or a by-pass circumventing said check valve, after the gas transfer into the downstream pipeline has been cut off by the cut-off valve, with the cut-off valve also releasing backflow from the downstream pipeline.

In order to largely simplify assembly the movable cut-off element of the check valve can be a piston or a diaphragm which is loaded by a spring and/or its own weight against the gas flow direction. The piston or diaphragm disk can simultaneously form the pressure sensitive element.

A particularly advantageous form of execution in terms of manufacturing and cost-effectiveness is achieved when a rising pressure in the gas pipeline placed downstream from the safety device moves the piston into a bore and a return movement of the piston is prevented by the engagement of a latching stop. The bore is sealed by a flexible sealing at the piston.

In order to obtain a stroke motion of the piston by an initially low friction between piston and seat already at a low pressure and simultaneously ensure tightness at rising pressure the bore is preferably tapered in the moving direction of the piston.

Preferably, the section of the bore that is assigned to the piston after the engagement of the latching stop has an expansion. The fact that the diameter of said expansion is larger than the diameter of the piston with flexible sealing creates a gap between piston and expansion through which the pressure in the downstream pipeline is relieved. Following said pressure relief the piston, under the impact of a spring and/or its own weight as well as the latching stop, is again outside of the expansion and its flexible sealing seals the bore.

A particularly simple construction in terms of manufacturing is obtained when the latching stop comprises an expansion of the bore and a flexible sealing. In this case the diameter of the expansion is smaller than that of the piston with a flexible sealing. In addition, the expansion-to-bore transition has a limit stop.

A further form of execution of the inventive safety device for cutting off gas pipelines is attained by coupling the pressure sensitive element to an already known gas flow control valve in such a way that the gas flow control valve is in a closed position after a pressure rise in the downstream pipeline. This can be achieved, e.g., by the pressure sensitive element releasing the lock of a pre-tensioned spring when pressure increases and the gas flow control valve is moved into its closed position by the impact of the spring.

Said coupling with a gas flow control valve makes it possible to safely close the downstream pipeline in an emergency case, irrespective of the operating state of the connected gas apparatus.

The axial movement of the piston is preferably limited on either side by a seat with the seat upstream from the piston forming the check valve together with the piston, while the seat downstream from the piston forming the gas flow control valve together with the piston.

In order to avoid an abrupt movement of the piston from its operating position upon switching on the gas apparatus, and thus a premature response of the gas flow control valve, the piston has, at least at one front face, an extension which slides with loose fit in a guide aperture which is gas-tight closed at the front side. Thus, the opening process is damped.

Further advantageous executions are obtained when the safety device has a manipulator that can be externally actuated and is used to take the spring into the pre-tensioned and locked position or/and with which the safety device in a closed position can be brought into its initial position.

Its is also possible to arrange a number of safety devices in a gas distributor.

BRIEF DESCRIPTION OF THE DRAWINGS

Below is a more detailed description of the invention by means of several practical examples. The figures show the following.

DESCRIPTION OF THE PREFERRED EMBODIMENTS

Figure 1:
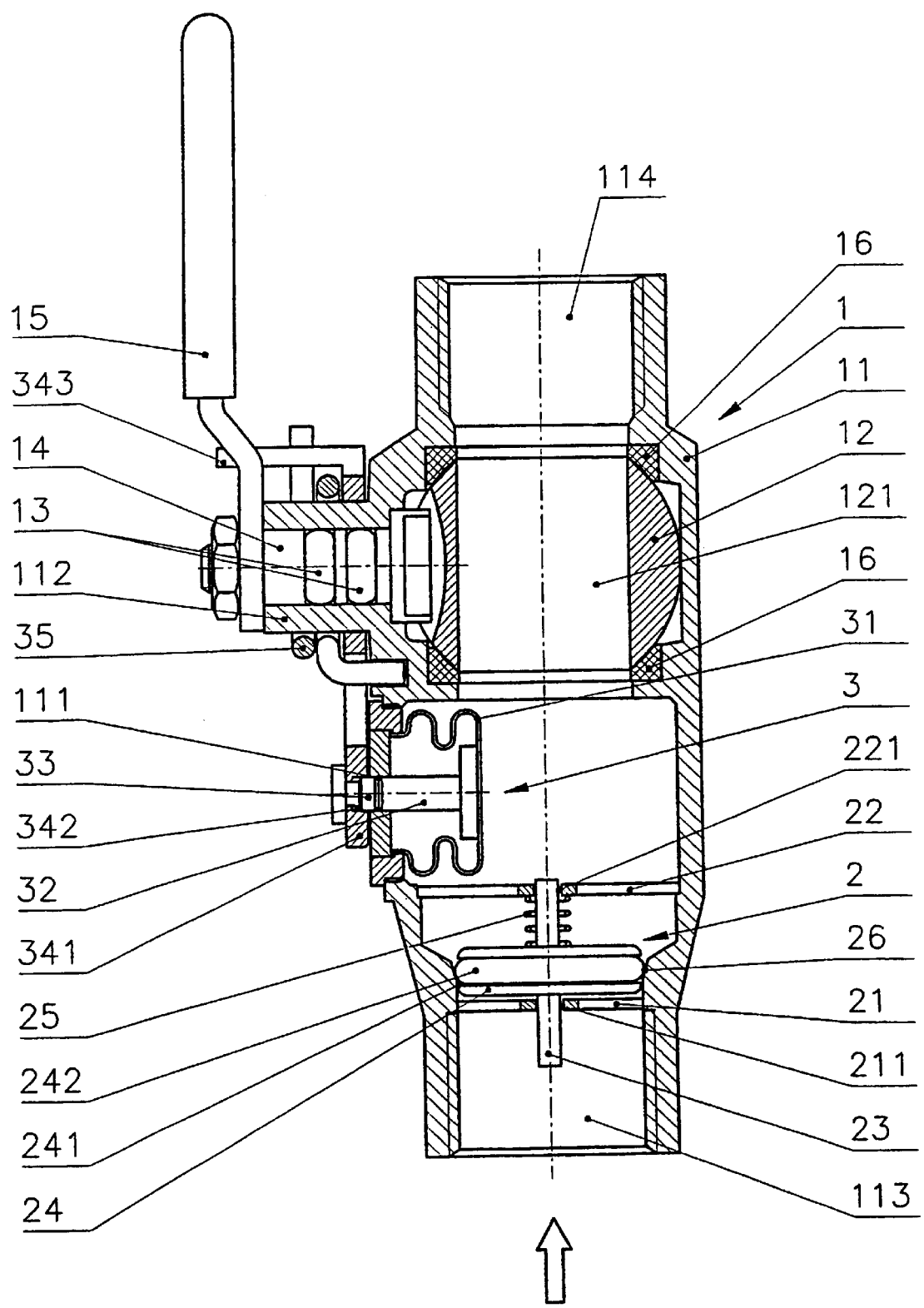
FIG. 1 is a sectional view of an inventive safety device with ball valve in accordance with the present invention.

The inventive safety device that is explained thereunder in greater detail is described in FIG. 1 on the basis of a ball valve that is known to the expert and used here as a cut-off valve 1. The safety device comprises a tubular housing 11 with a connection at either end, in this case drawn as a thread. It goes without saying that also another connection types are possible. Next to the inlet-side internal thread a check valve 2 is centrically arranged in the housing 11. The flow direction prevailing in the pipeline under normal operation conditions, hereinafter referred to as flow direction, is marked by an arrow.

The check valve 2 in this case comprises two punched disks 21/22 arranged behind each other in flow direction, which have at their centre a slide bearing 211/221 each for an axially movable tappet 23, to which a piston 24 is fastened between the punched disks 21/22. A pressure spring 25 actuates on the front face of the piston 24 opposite the gas inlet 113 whose other end is braced against the punched disk 22. In order to ensure gas tightness of the check valve 2 in closed position an O-ring is arranged as a flexible sealing 242 in a circumferential groove 241 of the piston 24, with the bore 26, tapered in flow direction and made through the internal wall of housing 11, providing the valve seat for the check valve 2.

The housing 11 also comprises a ball that is used as a shut-off mechanism 12, is pivot-borne in sealings serving as seat 16 and has a through-hole 121 in longitudinal direction of the housing 11. A pivoting axis 14, borne in a gastight manner on O-rings 13 and solidly connected to the tubular yoke 112 of the ball valve 1 housing 11, which leads radially to the outside is, on the one hand, keyed to the ball 12 and, on the other, to a manipulator 15 with which the ball valve 1 can be brought into its open or closed position by means of a swivelling movement. Construction and mode of action of ball valve 1 are known to the expert, hence, there is no need for a detailed explanation here.

A pressure sensitive element 3 is arranged between the ball valve 1 and the check valve 2. The pressure sensitive element 3 comprises a pot-shaped metal bellows 31 that is fixed in a gastight manner to the front face of the housing 11 internal wall and projects radially into the housing 11 interior and on whose bottom a tappet 32 is fixed whose other end is led lengthwise movable inside a through-hole 111 in the housing 11 wall. The tappet 32 supports a thrust piece 33 that projects from the housing 11 to the outside.

The yoke 112 bears an L-shaped lever in a pivotable manner whose one limb 341 has an aperture 342 into which the end of the thrust piece 33 projects that is led out of the housing 11. The other limb 343 sits close to the manipulator 15 when the ball valve 3 is in open position. A torsion spring 35 is axially led on the yoke 112 whose one end is braced against the housing 11 while the other end sits close to the limb 343 so that the latter loads the manipulator 15 in the closing direction of the ball valve 1 and the thrust piece 33 forms a latch for the lever.

The function of the inventive safety device that is described in this first practical example is as follows:

In the operating position the ball 12 of the ball valve 1 is open. If the gas apparatus located at the end of the downstream gas pipeline that is not depicted is out of operation, the check valve 2 is in its closed position. If now there is a temperature increase, e.g. by fire, in the section downstream from gas pipeline the heat causes a pressure rise in said pipeline. This pressure rise effects a stroke of the metal bellows 31 which, by means of the tappet 32, lifts the thrust piece 33 out of the through-hole 111 and hence its catch. Under the force of the tensioned torsion spring 35 the limbs 341 is not arrested any longer and hence the limb 343 and thus also the manipulator 15 are rotated into the closing direction and the ball valve 1 is closed. The safety device is in the safety position.

In order to prevent an excessive pressure rise in the downstream pipeline the safety device described in this practical example can have an additional bypass. A pressure control valve that is known to the expert and hence not further explained is functionally arranged in said bypass, which connects the up- and downstream pipeline while bypassing the safety device, in such a manner that it is always shut in the gas flow direction while a pressure compensation from the downstream to the upstream pipeline is possible. Said pressure control valve has to be adjusted in such a way that it responds only after a closing of the cut-off valve 1.

Figure 2:
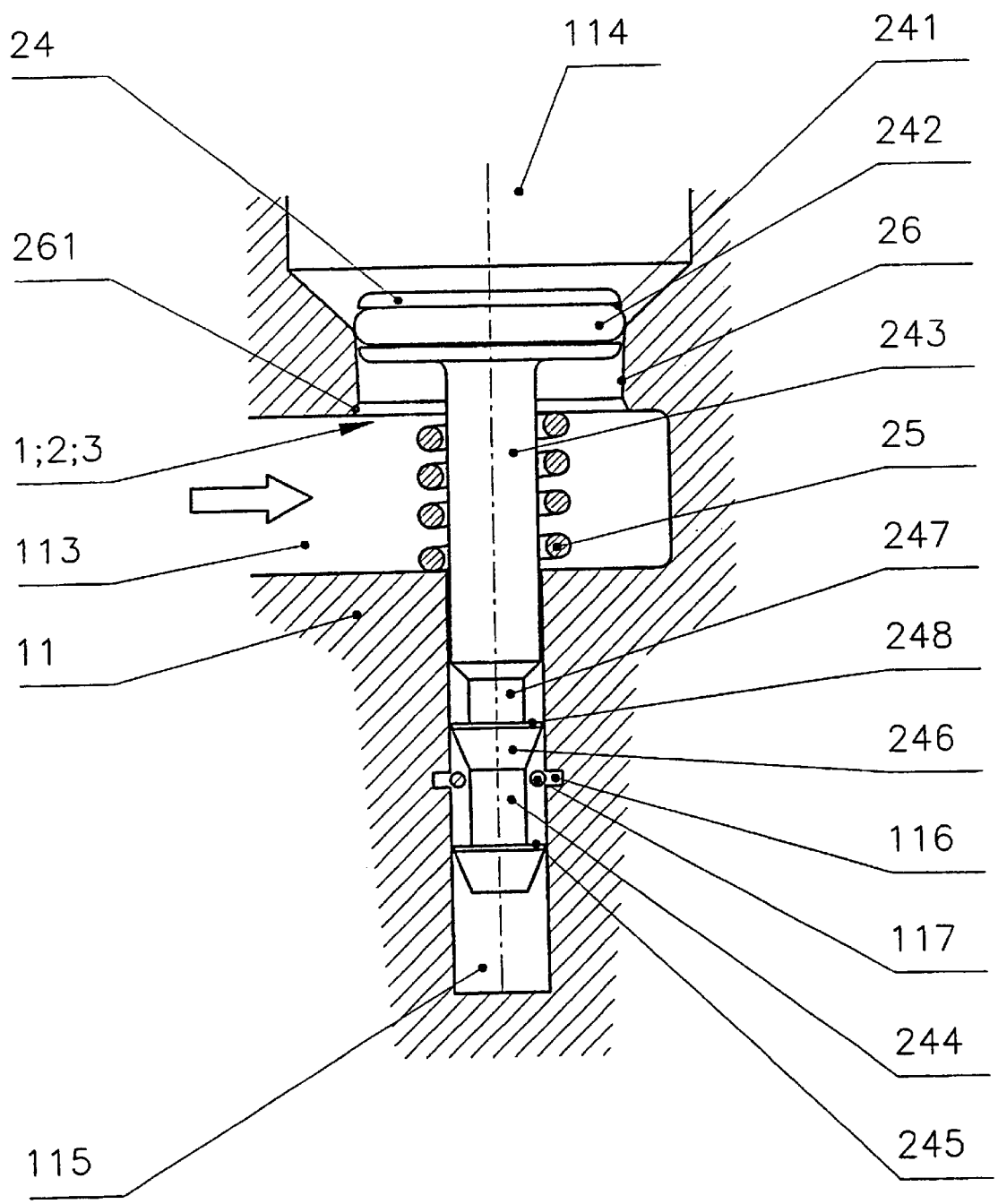
FIG. 2 is a fragmentary sectional view of another embodiment of an inventive safety device shown in an operating position.
Figure 3:
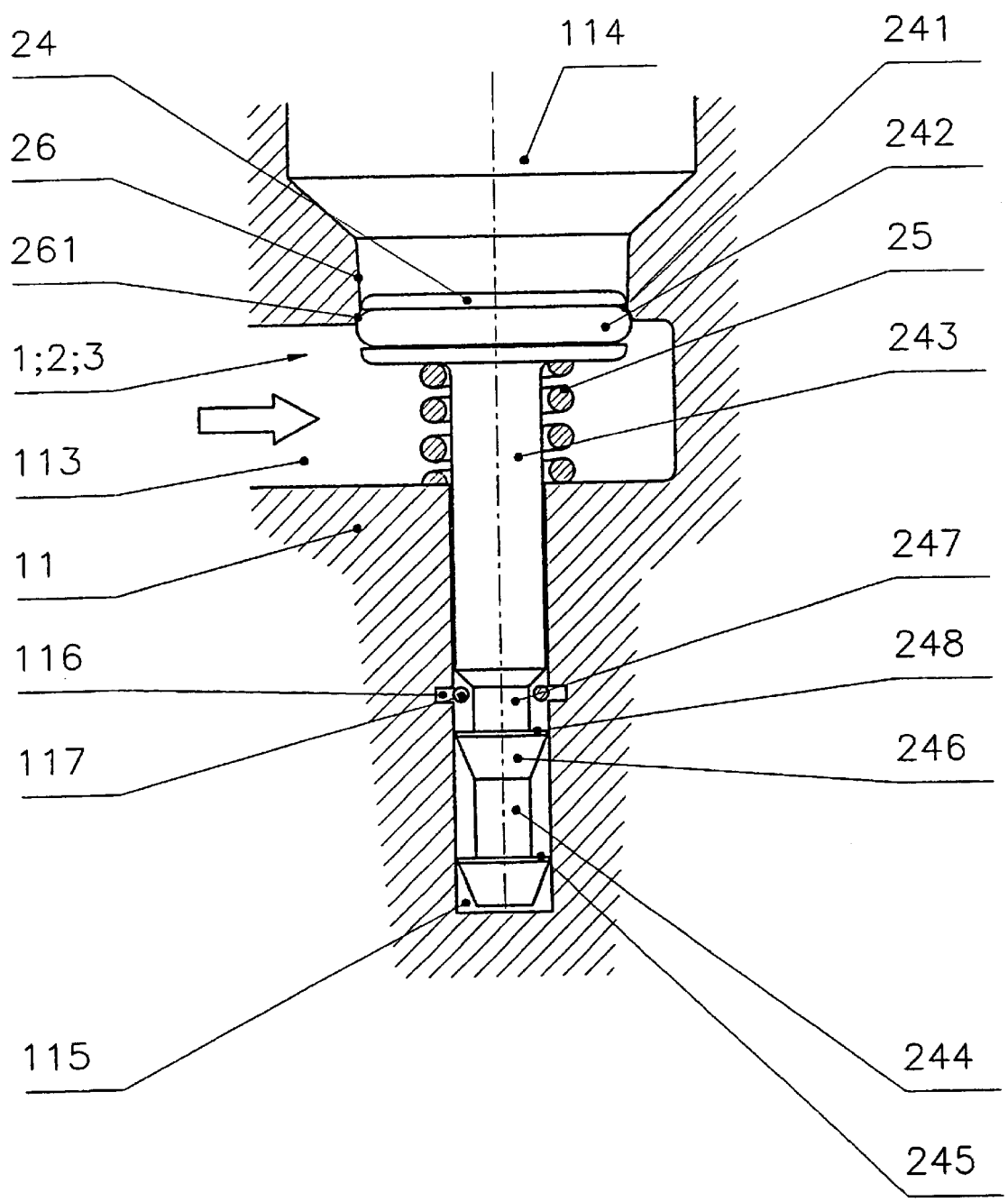
FIG. 3 is a view similar to that of FIG. 2 but showing the inventive safety device shown in a pressure compensation position.
Figure 4:
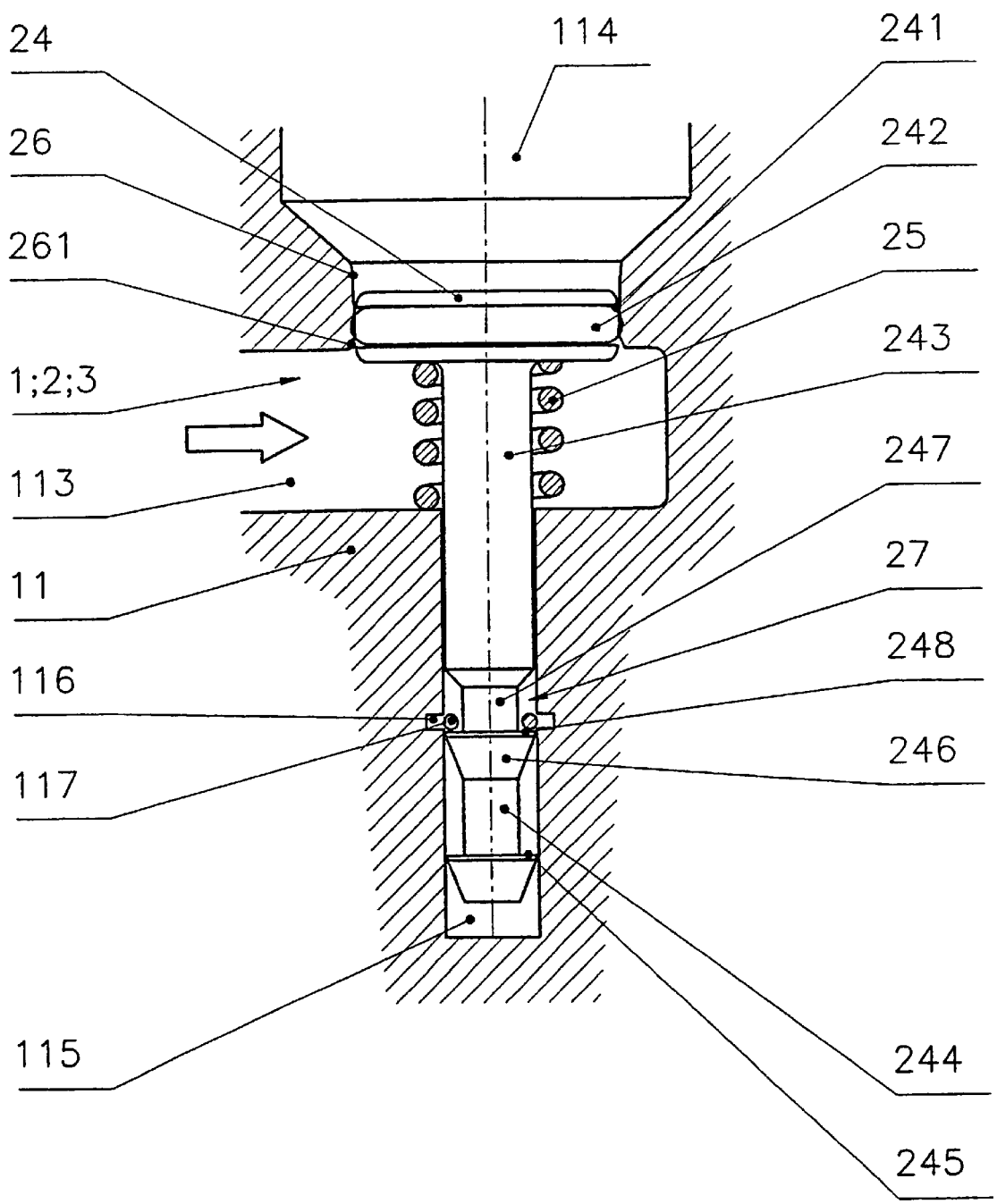
FIG. 4 is another view similar to FIG. 2 but showing inventive safety device shown in a safety position.

FIGS. 2 to 4 are schematic representations of a second modified practical example of an inventive safety device which is particularly distinguished by its simple construction. This inventive safety device comprises a housing 11 with a gas inlet 113 and a gas outlet 114 depicted as a corner arrangement in this practical example. Gas inlet 113 and gas outlet 114 are each provided with a connection for a gas pipeline not depicted here.

The housing 11 comprises a check valve 2 consisting of a piston 24 and a bore 26 in the housing 11 which forms a valve seat that is preferably tapered in flow direction. In flow direction downstream from the bore 26 is a piston 24 which, as in the first practical example, has an O-ring in a circumferential groove 241 as a flexible sealing 242 in order to ensure the gas tightness of the check valve 2 in closed position. The piston 24 is loaded by its own weight against the flow direction.

In addition, the piston 24 has at one side a front face extension 243 that is led into an aperture 115 in the housing 11. The aperture 115 is fitted with a groove 116 in which a radial spring-loaded element 117, e.g. a wire strap, is partially borne while its remainder sits in the aperture cross-section.

The extension 243 has a first contraction 244 in whose area a spring-loaded element 117 is positioned in the operating position (FIG. 2). The limitation of the contraction 244 opposite the piston 24 forms a first limit stop 245 that limits the opening stroke of the piston 24. By contrast the limitation of the first contraction 244 facing the piston 24 has a tapered transition 246 so that upon reaching the spring-loaded element 117 the latter expands into its groove 116 until a second contraction 247 arranged on the shaft 243 between piston 24 and first contraction 244 catches. By contrast the limitation of the second contraction 247 facing the first contraction 244 forms a second limit stop 248 that limits the stroke of the piston 24 in such a way that it cannot leave the bore 26 in flow direction. Thus, the second contraction 242 and the second limit stop 248 form a latching stop 27.

A pressure spring 25 is led on the extension 243 between housing 11 and piston 24. In operating position this pressure spring 25 is freely movable in longitudinal direction and thus ineffective (FIG. 2).

The mode of operation of the inventive safety device described in this second practical example is as follows:

In this practical example the piston 24, in combination with the bore 26, does not only take on the function of the check valve 2 but also that of the cut-off valve 1 as well as that of the pressure sensitive element 3 which results in the simple construction already mentioned elsewhere.

If the gas apparatus, placed at the end of the downstream gas pipeline that is not depicted, is out of operation the check valve 2 is closed (FIG. 2). The spring-loaded element 117 is in the first contraction 244, whose limit stop 245 limits the opening stroke when the gas apparatus is in switched on state. If there is now a temperature increase, e.g. due to fire, in the section of the downstream gas pipeline the generated heat causes a pressure rise in this pipeline. This pressure rise effects a stroke of the piston 24 against the flow direction and against the force of the then acting pressure spring 25 that is braced against the housing 11 and the piston 24. At the same time the stroke moves the extension 243 towards the spring-loaded element 117 so far that the spring-loaded element 117 slides across the conical transition 246 into the second contraction 247. At a respectively high and undesired pressure rise the stroke of the piston 24 creates a gap between the flexible sealing 242, formed by the O-ring, and the bore 26 which results in a pressure relief of the downstream pipeline (FIG. 3). Following said pressure relief the force of the pressure spring 25 returns the piston 24 into the bore 26, serving again as seat 16 of the cut-off valve 1. The latching stop 27 prevents the check valve 2 from opening. The safety device is in the safety position.

Figure 5:
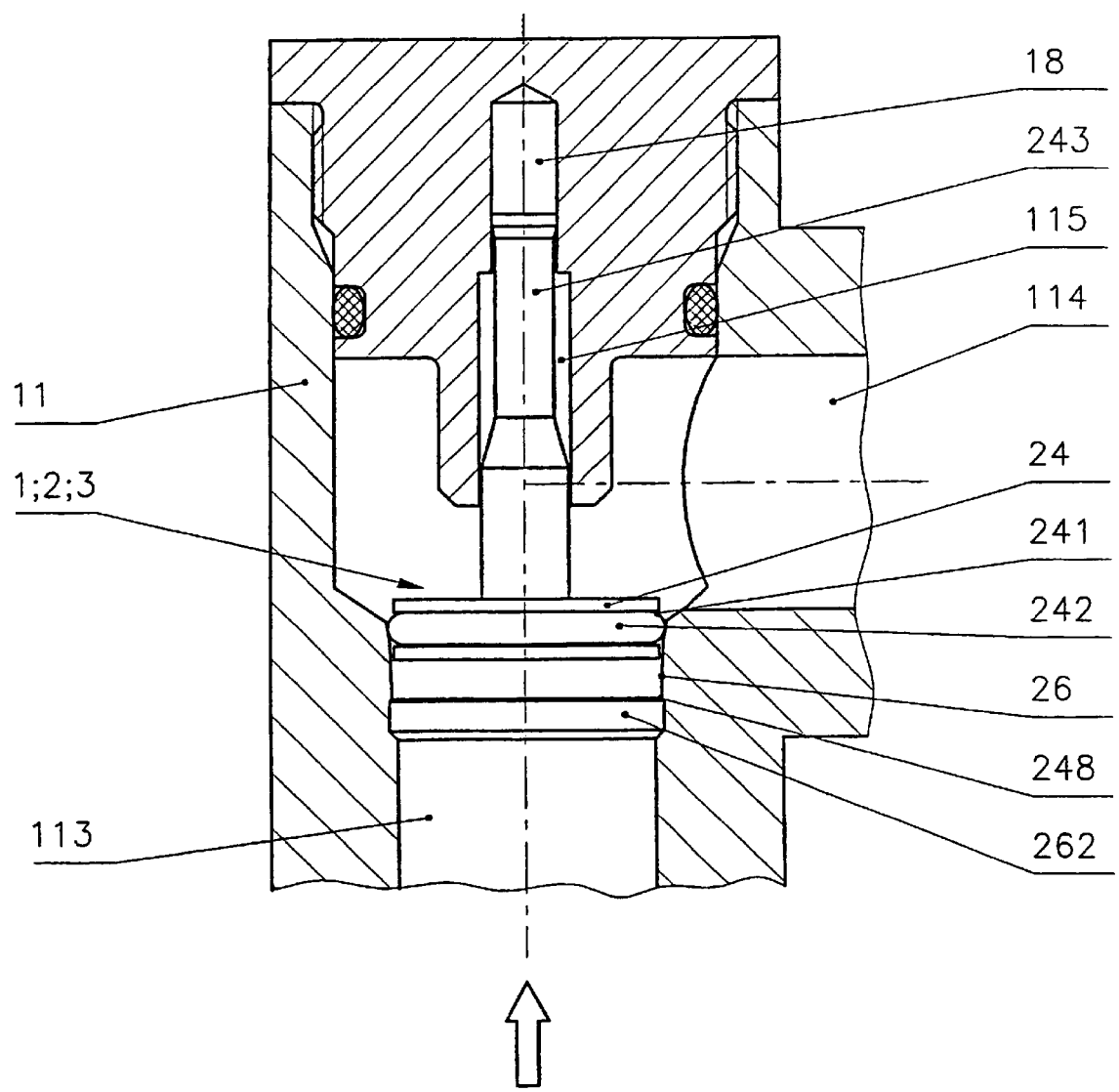
FIG. 5 is another embodiment of an inventive safety device shown with a gas flow control valve, shown in an operating position.
Figure 6:
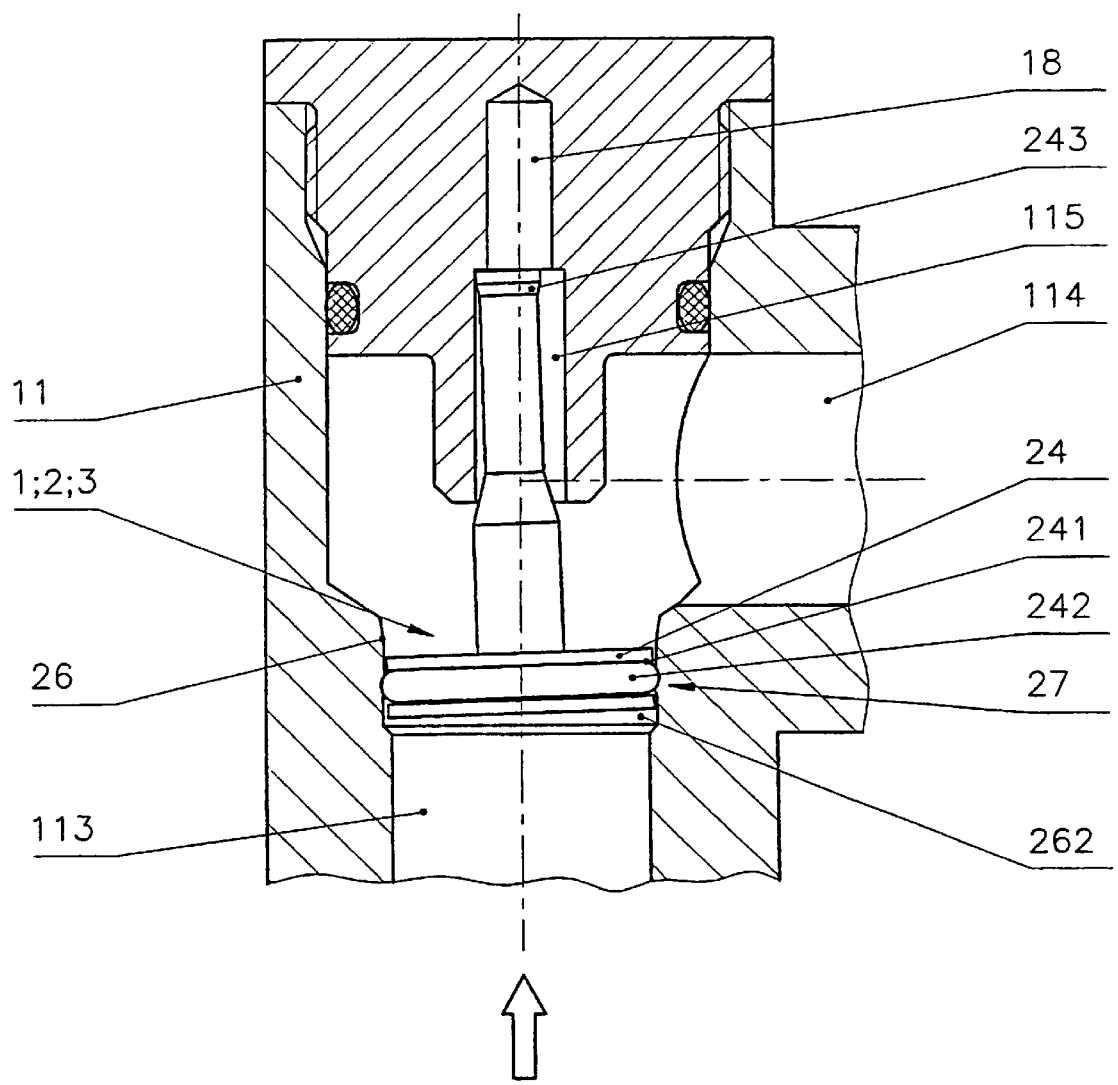
FIG. 6 is a view of the embodiment shown in FIG. 5 but shown in a safety position.
Figure 7:
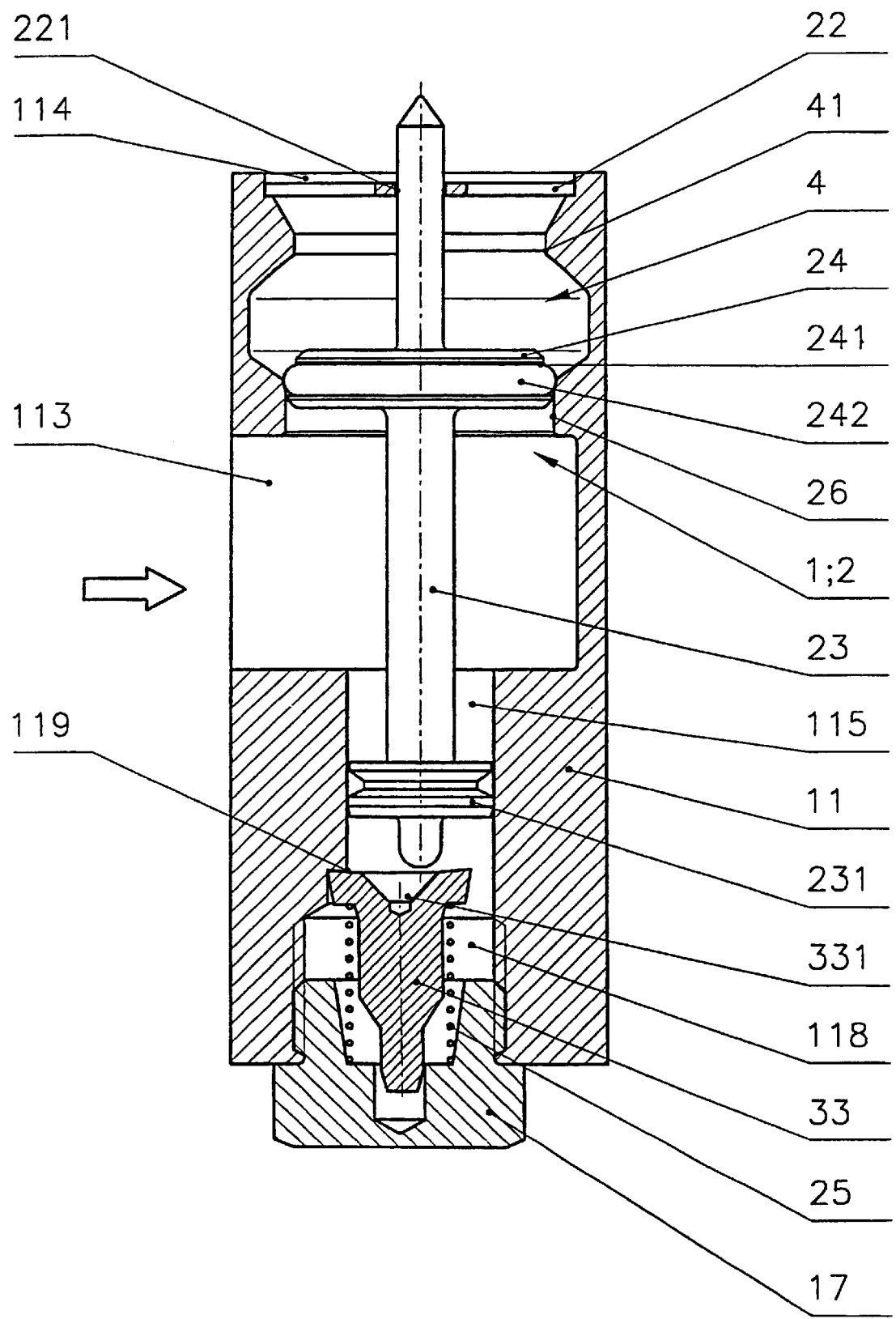
FIG. 7 is a sectional view of a further embodiment of an inventive safety device shown with a gas flow control valve, and in a operating position.

FIGS. 5 and 6 are schematic representations of a third practical example, as a modification of the second one, of an inventive safety device wherein there is no pressure relief.

This inventive safety device also comprises a housing 11 with a gas inlet 113 and a gas outlet 114 depicted as a corner arrangement in this practical example. Gas inlet 113 and gas outlet 114 are each provided with a connection for a gas pipeline not depicted here.

Also in this practical example the housing 11 is provided with a check valve 2, consisting of a piston 24 and a valve seat formed by a bore 26 in the housing 11, which is preferably tapered in flow direction. Downstream from the bore 26 in flow direction there is a piston 24 which, as in the first and second practical examples, has an O-ring in a circumferential groove 241 as flexible sealing 242 to ensure the gas tightness of the check valve 2 in closed position. The piston 24 is loaded by its own weight against the flow direction. Upstream the bore 26 verges into an expansion 262 whose diameter is smaller than that of the piston 24 with the flexible sealing element 242. The transition from the expansion 262 to the bore 26 has a limit stop 248 so that the flexible sealing element 242 and the expansion 262 form a latching stop 27 suited for low line pressures. For higher line pressures the latching stop 27 can be executed in such a way that the piston 24 one side has a front-face extension 243 that is led in the guidance section 18 of an aperture 115 as long as the piston is outside of the expansion 262. The mode of operation of the inventive safety device described in this third practical example, wherein, for the sake of simplicity, there is no pressure relief, as already mentioned elsewhere, is as follows:

If the gas apparatus, placed at the end of the downstream from gas pipeline that is not depicted, is out of operation the check valve 2 is closed (FIG. 5). The extension 243 is in the guidance section 18. If now there is a temperature increase, e.g. due to fire, in the section of the downstream gas pipeline the generated heat causes a pressure rise in this pipeline. This pressure rise effects a stroke of the piston 24 against the flow direction and the piston 24 gets into the expansion 262. The latching stop 27 prevents an opening of the check valve 2. The safety device is in the safety position.

In the version that is suited for higher line pressures the stroke moves the extension 243 in the aperture 115 so far that it leaves the guidance section 18 and, due to a toeing of the extension (Fig. 6), gets into the safety position.

FIGS. 7 to 12 are schematic representations of a modified practical example of an inventive safety device. In this practical example the safety device is combined with a gas flow control valve 4.

This inventive safety device comprises a housing 11 with a gas inlet 113 and a gas outlet 114 depicted as a corner arrangement in this practical example. Gas inlet 113 and gas outlet 114 are each provided with a connection for a gas pipeline not depicted here.

The housing 11 comprises a check valve 2 consisting of a piston 24 and a bore 26 in the housing 11 which form a valve seat that is preferably tapered in flow direction. In flow direction downstream from the bore 26 is a piston 24 which, as in the first practical example, has an O-ring in a circumferential groove 241 as a flexible sealing 242 in order to ensure the gas tightness of the check valve 2 in closed position. The piston 24 is loaded by its own weight against the flow direction.

In flow direction downstream from the piston 24 the housing 11 has a second contraction which is formed as the seat 41 of an already known gas flow control valve 4 whose shut-off mechanism is formed by a piston 24 in this practical example. The piston 24 is solidly connected to a longitudinally movable tappet 23 that is led in a slide bearing 221, arranged in a punched disk 22 that is placed in flow direction downstream from the seat 41 in the housing 11, and in an aperture 115. Preferably the tappet 23 has a guide collar 231 that forms a loose fit with the aperture 115. Next to the aperture 115 is a bore 118 leading outside that is closed in a gastight manner by an inspection plug 17. The bore 118 is arranged in a staggered way to the aperture 115 so that at least a unilateral locating edge 119 is formed for a thrust piece 33 that is placed in the bore 118 but otherwise longitudinally movable and braced against the inspection plug 17 by a pressure spring 25, and loaded towards the tappet 23. The front face of the thrust piece 33 facing the tappet 23 has a funnel-shaped receiver 331 for the tappet.

The mode of operation of the inventive safety device with a gas flow control valve 4 described in this fourth practical example is as follows:

Also in this practical example the piston 24, in combination with a seat formed by the bore 26, does not only take on the function of the check valve 2 but also that of the cut-off valve 1 as well as that of the pressure sensitive element 3 which results in the simple construction already mentioned elsewhere. At the same time the piston 24 is used as a shut-off mechanism for the gas flow control valve 4 whose seat 41 is integrated into the housing 11.

If the gas apparatus, placed at the end of the downstream from gas pipeline that is not depicted, is out of operation the check valve 2 is closed (FIG. 7), i.e. the piston 24 is in the area of the bore 26. In order to prevent upon switching on of the gas apparatus that an abrupt opening stroke moves the piston 24 against the seat 41 the tappet 23 has a guide collar 231, already mentioned above, which, in combination with the loose fit to the aperture 115 acts as an attenuator.

If there is now a temperature increase, e.g. due to fire, in the section of the downstream gas pipeline the generated heat causes a pressure rise in this pipeline. This pressure rise effects a stroke of the piston 24 against the flow direction which initially moves the tappet 23 into the funnel-shaped receiver 331 and then lifts the thrust piece 33, against the force of the acting pressure spring 25 that is braced against the thrust piece 33 and the inspection plug 17, from the locating edge 119 and thus releases the locking.

Figure 8:
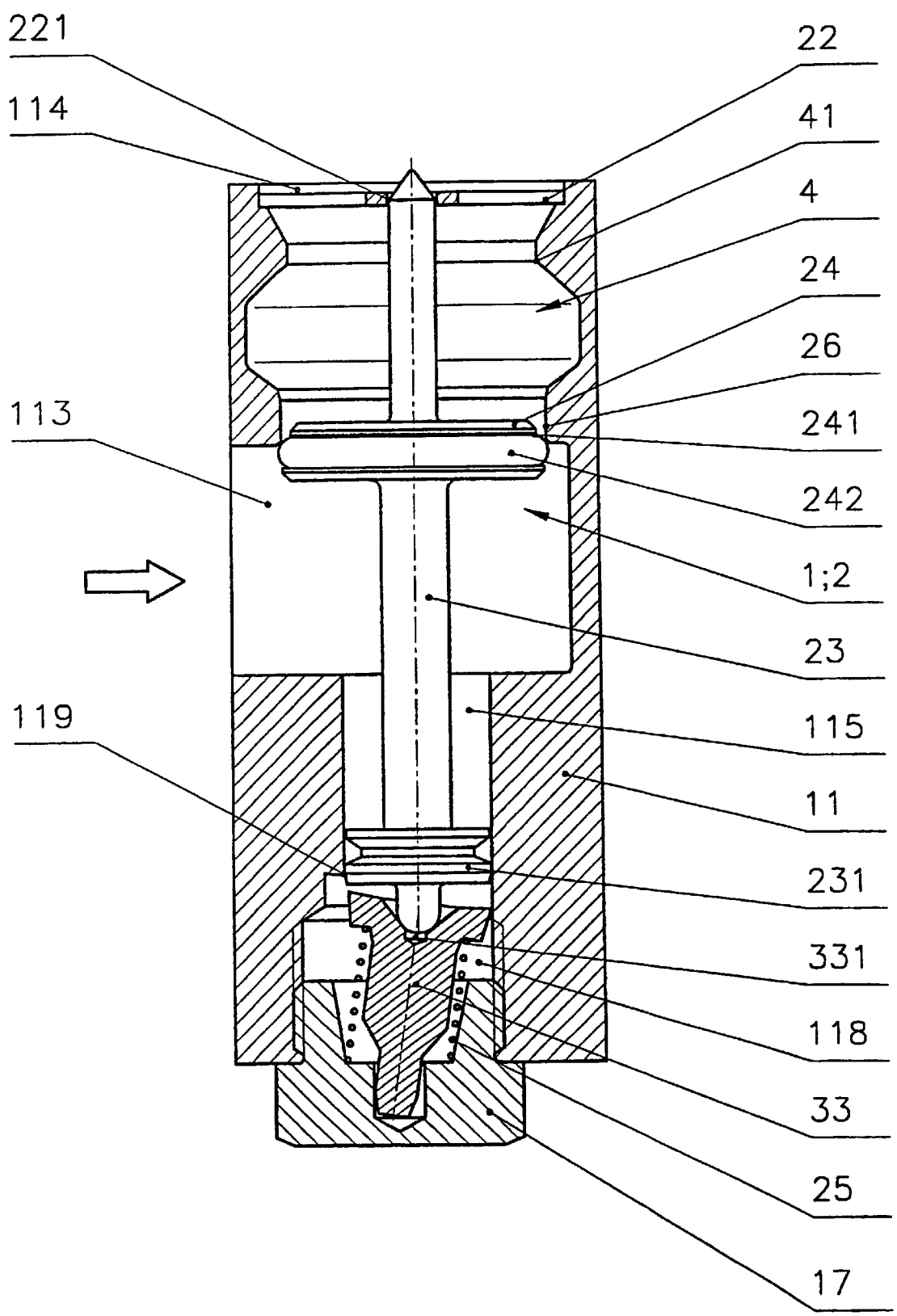
FIG. 8 is a view of the embodiment of FIG. 7 shown with a gas flow control valve, and in a pressure compensation position, FIG. 9 a view of the embodiment of FIGS. 7 and 8 shown in a safety position.
Figure 9:
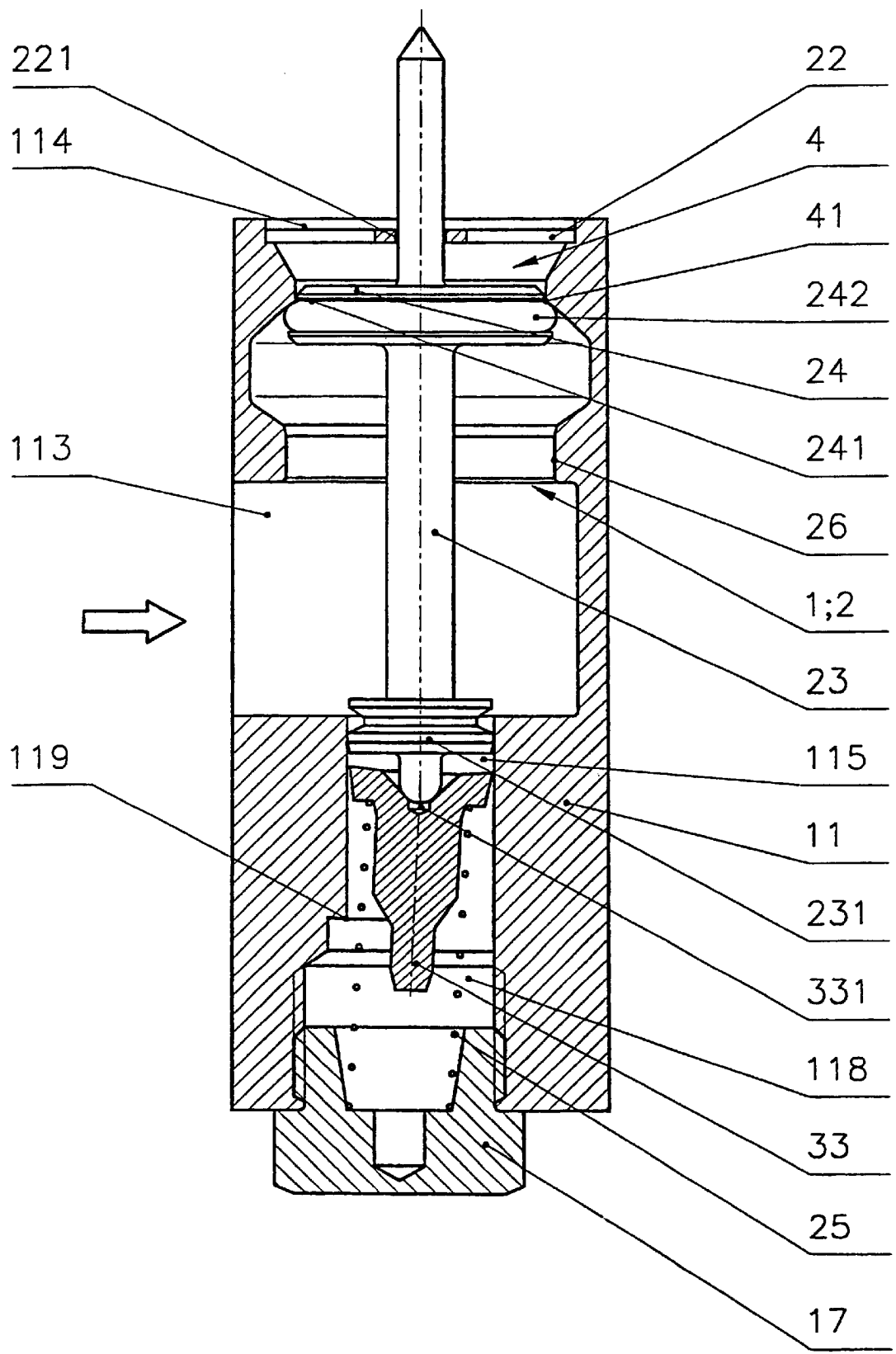

At a respectively high and undesired pressure rise the stroke of the piston 24 creates a gap between the flexible sealing 242, formed by the O-ring, and the bore 26 which results in a pressure relief of the downstream pipeline (FIG. 8). Following said pressure relief the force of the pressure spring 25 moves the piston 24 towards the seat 41 which than serves as the seat 16 of the cut-off valve 1 (FIG. 9). The safety device is in the safety position.

After the removal of the inspection plug 17 the thrust piece 33 can be returned to its initial position and the pressure spring 25 tensioned.

Figure 10:
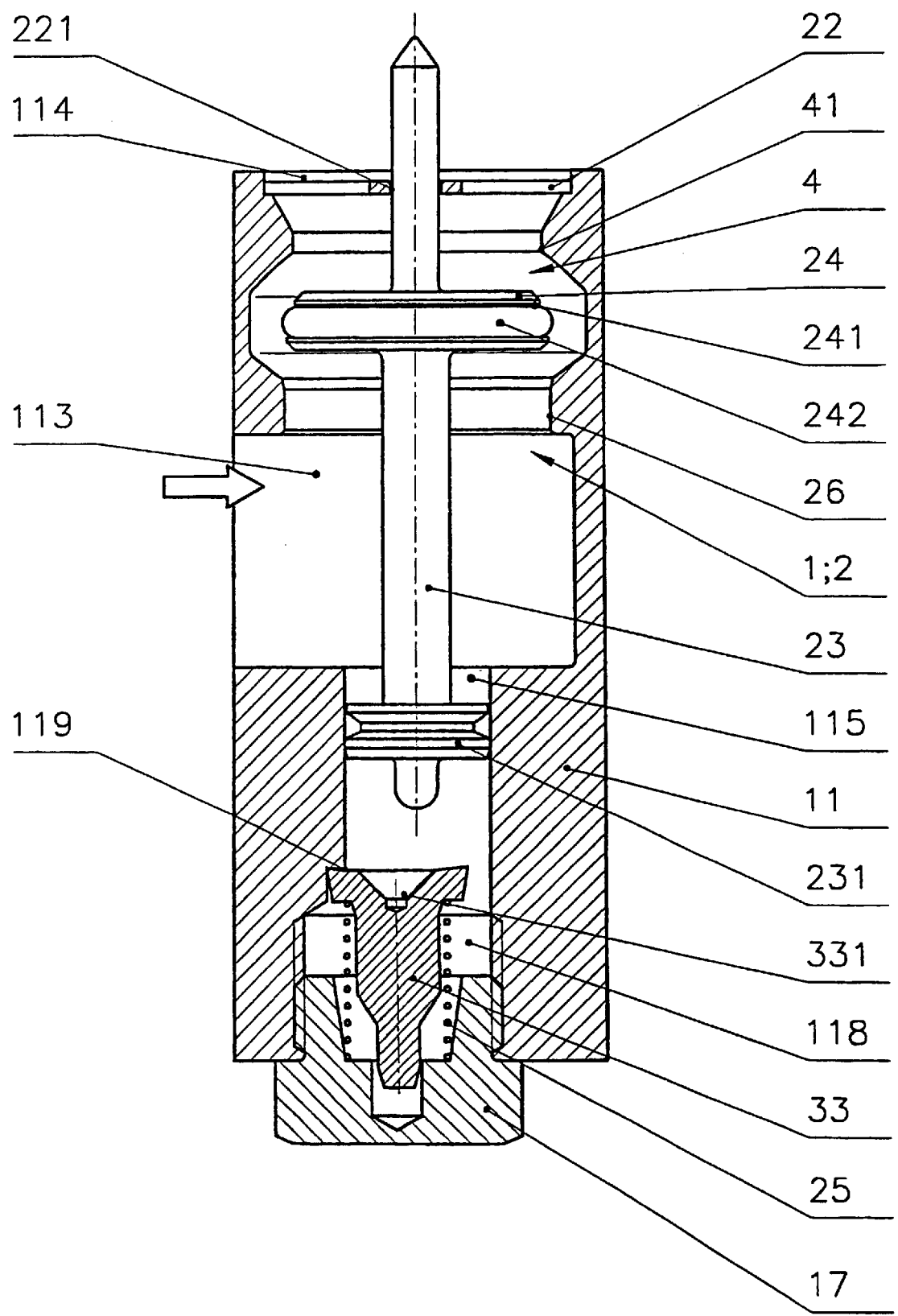
FIG. 10 is a view of the embodiment shown in FIGS. 7, 8, and 9 but shown in a working position.
Figure 11:
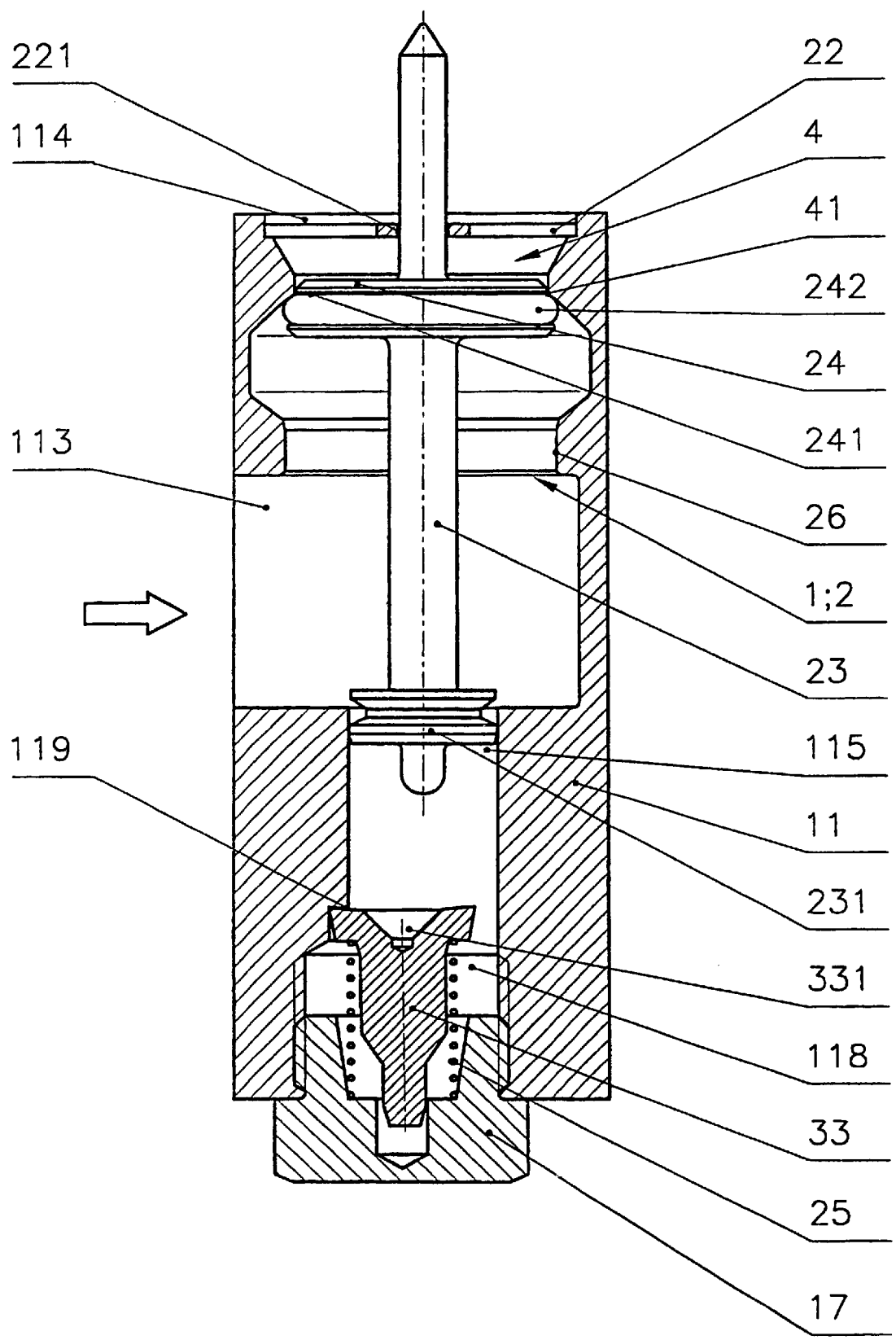
Fig. 11 is a view of the embodiment of FIGS. 7, 8 and 9 shown with a closed gas flow control valve.

If the gas apparatus located at the end of the downstream gas pipeline that is not depicted is in operation, the check valve 2 is in its open position. It is in a working position (FIG. 10). The piston 24 is in the area between the bore 26 and the valve seat 41. If now there is an increase in the gas volume flow in the downstream gas pipeline the piston 24 is moved towards the seat 41, i.e. the gas flow control valve 4 closes and the safety device is in the safety position (FIG. 11).

Figure 12:
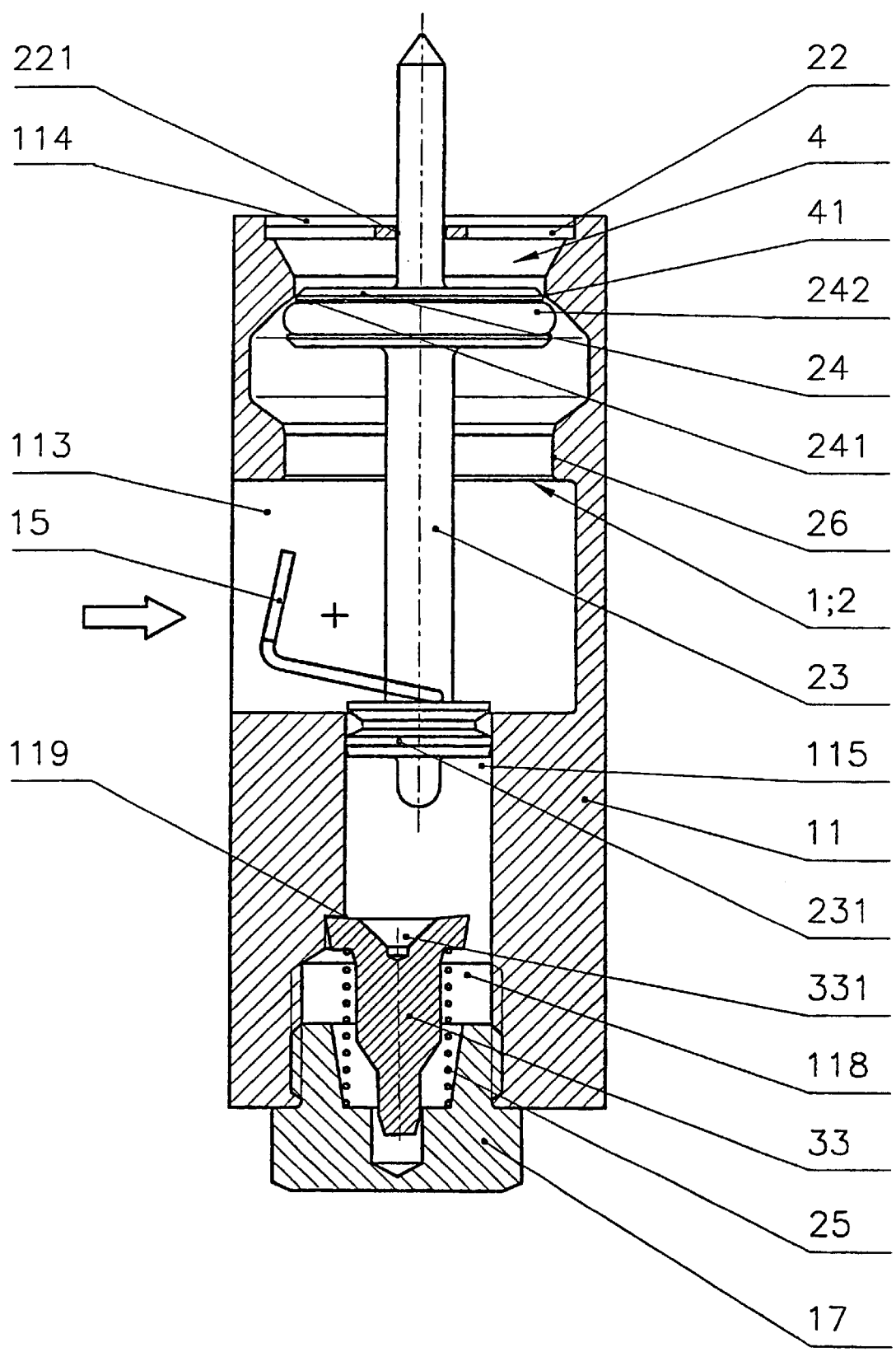
FIG. 12 is a view of the embodiment of FIGS. 7, 8 and 9 but shown incorporating a manipulator.

FIG. 12 shows the practical example of an inventive safety device that is schematically represented in FIGS. 7 to 11 and described in detail already elsewhere with an additional manipulator 15 that can be externally actuated and is borne in a gastight manner in a duct in the housing 11 not depicted here. The piston 24 can be lifted from the seat 41 by actuating said manipulator 15. Thus, the safety device in closed position can be returned to its initial position in non-defective gas pipelines and with closed gas apparatus.

As a matter of course the inventive safety device is not restricted to the shown practical examples. There are rather alterations and modifications possible without leaving the scope of the invention. Connections can be varied, for example. Also the described combined sub-assemblies can be executed as individual components or the described parts can be replaced by equivalents. Also a combination of the practical examples described, e.g., in FIGS. 2 to 6 is possible. Moreover, the inventive safety device can also have a manipulator 15 that is externally operable as additionally schematically represented only in FIG. 12 for the fourth example. Also the arrangement of several inventive safety devices in a gas distributor is possible.

What is claimed is:

1. A safety device for cutting off a gas pipeline above a predetermined temperature, the safety device comprising:
   a check valve to prevent a backflow from a portion of a gas pipeline situated downstream to the safety device; and
   a pressure-sensitive element coupled to a cut-off valve in such a way that in case of rising pressure in the pipeline, the cut-off valves stops the gas flow through the pipeline, the pressure-sensitive element pressurized by a pressure prevailing in the downstream portion of the pipeline being located within the gas pipeline, the check valve for preventing the backflow formed by the cut-off valve being situated within the gas pipeline upstream to the pressure-sensitive element.

2. A safety device for cutting off gas pipelines according to claim 1, wherein the check valve releases a backflow from the downstream portion of the pipeline after a gas transfer into the downstream portion of the pipeline has been cut off to prevent inadmissible overpressure in the downstream portion of the pipeline.

3. A safety device for cutting off gas pipelines according to claim 1, wherein the movable closing element of the check valve is a piston or a diaphragm disk that is loaded by a spring and/or its own weight against the gas flow direction and that the piston or the diaphragm disk forms the pressure sensitive element.

4. A safety device for cutting off gas pipelines according to claim 3, wherein the piston is movable in response to a rising pressure in the downstream portion of the pipeline into a bore and wherein an engaging latching stop prevents a return movement of the piston and that said piston with a flexible sealing seals the bore.

5. A safety device for cutting off gas pipelines according to claim 4, wherein the bore is tapered in the moving direction of the piston.

6. A safety device for cutting off gas pipelines according to claim 4, wherein a section of the bore that is assigned to the piston after the engagement of the latching stop has an expansion whose diameter is larger than that of the piston with a flexible sealing and that the bore is sealed by the piston with the attached flexible sealing after a pressure relief in the downstream pipeline through the created gap and under the impact of a spring and/or its own weight as well as the latching stop.

7. A safety device for cutting off gas pipelines according to claim 4, wherein the latching stop consists of an expansion of the bore and the flexible sealing, the transition from the expansion to the bore having a limit stop.

8. A safety device for cutting off gas pipelines according to claim 1, wherein the pressure sensitive element is coupled to a gas flow control valve in such a way that the gas flow control valve is in a closed position when the pressure increases in the downstream portion of the pipeline.

9. A safety device for cutting off gas pipelines according to claim 8, wherein a pressure sensitive element releases the lock of a pre-tensioned spring when pressure increases and that the gas flow control valve moves into its closed position under the impact of a spring.

10. A safety device for cutting off gas pipelines according to claim 8, wherein the axial movement of the piston is limited on either side by a seat, the seat upstream from the piston forming the check valve together with the piston the seat downstream from the piston forming a gas flow control valve together with the piston.

11. A safety device for cutting off gas pipelines according to claim 10, wherein the piston has an extension on at least one front face which slides with a loose fit in a guidance aperture whose front face is closed in a gastight manner.

12. A safety device for cutting off gas pipelines according to claim 9, wherein the safety device has an externally operable manipulator with which the spring can be brought into a pre-tensioned and latched position.

13. A safety device for cutting off gas pipelines according to claim 1, wherein the safety device has an externally operable manipulator with which the safety device in closed position can be returned into its initial position.

14. A safety device for cutting off gas pipelines according to claim 2, wherein the check valve includes a movable closing element in the form of a piston or a diaphragm disk that is loaded by a spring and/or its own weight against the gas flow direction and that the piston or the diaphragm disk simultaneously form a pressure sensitive element.

15. A safety device for cutting off gas pipelines according to claim 14, wherein the piston can be moved by rising pressure in the downstream pipeline into a bore wherein an engaging latching stop prevents a return movement of the piston and that said piston with a flexible sealing seals the bore.

16. A safety device for cutting off gas pipelines according to claim 5, wherein the section of the bore that is assigned to the piston after the engagement of the latching stop has an expansion whose diameter is larger than that of the piston with a flexible sealing and that the bore is sealed by the piston with the attached flexible sealing after a pressure relief in the downstream pipeline through the created gap and under the impact of a spring and/or its own weight as well as the latching stop.

17. A safety device for cutting off gas pipelines according to claim 5, wherein the latching stop consists of an expansion of the bore and the flexible sealing, the transition from the expansion to the bore having a limit stop.

18. A safety device for cutting off gas pipelines according to claim 15, wherein in that the section of the bore that is assigned to the piston after the engagement of the latching stop has an expansion whose diameter is larger than that of the piston with a flexible sealing and that the bore is sealed by the piston with the attached flexible sealing after a pressure relief in the downstream portion of the pipeline through the created gap and under the impact of a spring and/or its own weight as well as the latching stop.

19. A safety device for cutting off gas pipelines according to claim 15, wherein the latching stop consists of an expansion of the bore and a flexible sealing wherein the diameter of said expansion is smaller than that of the piston with a flexible sealing and that the transition from the expansion to the bore has a limit stop.

20. A safety device for cutting off gas pipeline according to claim 1, further comprising a bypass circumventing the check valve for preventing an inadmissible overpressure in the downstream portion of the pipeline, the bypass for releasing a backflow from the downstream portion of the pipeline after a gas transfer into the downstream portion of the pipeline has been cut off.

* * * * *